United States Patent [19]

Messina

[11] 4,023,978

[45] May 17, 1977

[54] AEROSOL SPRAY STARCH FORMULATION

[75] Inventor: Ralph Paul Messina, Somerset, N.J.

[73] Assignee: Colgate-Palmolive Company, New York, N.Y.

[22] Filed: Aug. 4, 1975

[21] Appl. No.: 601,736

Related U.S. Application Data

[63] Continuation of Ser. No. 410,597, Oct. 29, 1973, abandoned.

[52] U.S. Cl. .............................................. 106/213
[51] Int. Cl.$^2$ ......................................... C08L 3/00
[58] Field of Search ................. 106/213, 211, 212; 252/305

[56] References Cited

UNITED STATES PATENTS

| | | | |
|---|---|---|---|
| 2,732,309 | 1/1956 | Kerr | 106/213 |
| 2,994,615 | 8/1961 | McDonald | 106/213 |
| 3,083,112 | 3/1963 | Evans | 106/213 |
| 3,181,961 | 5/1965 | Katzbeck | 106/213 |
| 3,373,126 | 3/1968 | Lehrman | 252/305 |
| 3,692,552 | 9/1972 | Ruggeberg | 106/208 |

*Primary Examiner*—Theodore Morris
*Attorney, Agent, or Firm*—Herbert S. Sylvester; Murray M. Grill; Norman Blumenkopf

[57] ABSTRACT

An improved aerosol spray starch formulation is prepared by combining a starch component, a polyhydric material, a nonionic surfactant and a mixture of boric acid and borax in an aqueous medium together with a normally gaseous liquefied propellant. The starch formulation provides after pressing an excellent starching effect, that is, stiffness without roughness, without flaking or aerosol clogging.

9 Claims, No Drawings

AEROSOL SPRAY STARCH FORMULATION

This is a continuation of application Ser. No. 410,597 filed Oct. 29, 1973 now abandoned.

The present invention relates to starch formulations of the type typically used by the housewife in finishing home laundered textile garments. More specifically, the invention provides a starch formulation suitable for spraying from an aerosol container, which formulation has improved fabric penetrating power and improved anti-flaking characteristics.

In the past certain aerosol starch formulations have had a tendency to cause a treated fabric to become unsightly. Apparently, this has been due to the tendency of the formulation to build up deposits on a sole plate of the iron. Upon continued ironing, these deposits would scorch and transfer to the fabric being ironed, leaving portions of the fabric with a blackened appearance.

In accordance with the present invention, there is provided a new spray starch formulation with a substantially reduced tendency to build up deposits on the sole plate of an iron. In this way the fabric discoloration problem of the prior art is practically eliminated. The improvement is accomplished by using an aqueous starch containing solution or dispersion which includes, in addition to the starch component, a boric acid-borax buffering system, a nonionic-surfactant and a polyhydric compound as set forth hereinbelow.

An aqueous solution or dispersion of any type of starch, e.g. those derived from corn, wheat, rice, grain sorghum, waxy grain sorghum, waxy maize or tapioca, or mixtures thereof and water soluble or dispersible modifications or derivatives thereof, containing more than about 85 percent by weight of water and from about 2 percent to about 6 percent by weight of starch may be employed in the new formulations of the invention. Modified starches that may be used in the new formulations include natural starches that have been degraded to obtain a lower viscosity by acidic, oxidative or enzymic depolymerization. Additionally, low viscosity commercially available propoxylated and ethoxylated starches are useable in the new formulations and are presently preferred since their low viscosity at relatively high solids concentrations make them very adaptable to spraying processes. Suitable alkoxylated, low viscosity starches are submicron sized particles of hydrophobic starch that are readily dispersed in water and are prepared by alkoxylation of granular starch with a monofunctional alkoxylating agent which provides the starch with ether linked hydrophilic groups. A suitable method for their preparation is taught in U.S. Pat. No. 3,462,283. In accordance with the invention, the propoxylated or ethoxylated starch derivatives are dispersed in the aqueous medium in an amount of from about 2 percent to about 6 percent by weight of the spray formulation.

The polyhydric component of the new formulation, which enhances the wetting and anti-clogging properties of the composition is typically present in quantities of from about 0.05 to about 1% by weight of the mixture, preferably about 0.1 to 0.5% by weight. The polyhydric compound is chosen from the group of polymeric glycols of alkanes and olefins having from 2 to about 6, preferably 2 carbon atoms. Representative and preferred members of this group of compounds are polyethylene glycols having molecular weights from about 1000 to about 12000. Most preferable among this group of polyhydric components is a polyethylene glycol having a molecular weight of 6000 present in the composition.

Another component of the new formulation is a nonionic surfactant which enhances the penetration of the composition into the fabric. This diminishes the sole plate build up and helps reduce the amount of flaking which may occur. The nonionic surfactants of the present formulation are generally present in quantities of from about 0.01% to about 0.5% by weight of the mixture.

The nonionic synthetic organic detergents are generally the condensation product of an organic aliphatic or alkyl aromatic hydrophobic compound and hydrophilic alkylene oxide groups. Practically any hydrophobic compound having a carboxy, hydroxy, amido, or amino group with a free hydrogen attached to the nitrogen can be condensed with an alkylene oxide such as ethylene oxide or with the polyhydration products thereof, e.g., polyethylene glycol, to form a nonionic detergent. Further, the length of the polyalkyleneoxy chain can be adjusted to achieve the desired balance between the hydrophobic and hydrophilic elements.

Useful for the nonionic compound types of hydrophobes are higher aliphatic alcohols and alkyl phenols, although others may be used such as carboxylic acids, carboxamides, mercaptans, sulphonamides, etc. The ethylene oxide condensates with higher-alkyl phenols represent a preferred class of nonionic compounds. Usually the hydrophobic moiety should contain at least about 6 carbon atoms, and preferably at least about 8 carbon atoms, and may contain as many as about 50 carbon atoms or more. The amount of alkylene oxide will vary considerably depending upon the hydrophobe, but as a general guide and rule, at least about 5 moles of alkylene oxide per mole of hydrophobe should be used. The upper limit of alkylene oxide will vary, also, but no particular criticality can be ascribed thereto. As much as 200 or more moles of alkylene oxide per mole of hydrophobe may be employed. While ethylene oxide is the preferred and predominating oxyalkylating reagent, other lower alkylene oxides such as propylene oxide, butylene oxide, and the like may also be used or substituted in part for the ethylene oxide.

Other nonionic compounds which are suitable are the polyoxyalkylene esters of the organic acids such as the higher fatty acids, the rosin acids, tall oil acids, acids from petroleum oxidation products, etc. These esters will usually contain from about 10 to about 22 carbon atoms in the acid moiety and from about 12 to about 30 moles of ethylene oxide or its equivalent.

Still other nonionic surfactants are the alkylene oxide condensates with the higher fatty acid amides. The fatty acid group will generally contain from about 8 to about 22 carbon atoms and this will be condensed with about 10 to about 50 moles of ethylene oxide. The corresponding carboxamides and sulphonamides may also be used as substantial equivalents.

Still another class of nonionic products are the oxyalkylated higher aliphatic alcohols. The fatty alcohols should contain at least 6 carbon atoms, and preferably at least about 8 carbon atoms. The most preferred alcohols are lauryl, myristyl, cetyl, stearyl and oleyl alcohols and should be condensed with at least about 6 moles of ethylene oxide and, preferably, about 10 to 30 moles of ethylene oxide. A typical nonionic product is oleyl alcohol condensed with 15 moles of ethylene oxide. The corresponding alkyl mercaptans when condensed with ethylene oxide are also admirably suitable in the compositions of the present invention.

Still other suitable nonionics are the polyoxyethylene polyoxypropylene adducts of 1-butanol. The hydrophobe of these nonionics has a minimum molecular weight of 1,000 and consists of an aliphatic monohydric alcohol containing from 1 to 8 carbon atoms to which is attached a heteric chain of oxyethylene and oxypropylene. The weight ratio of oxypropylene to oxyethylene covers the range of 95:5 to 85:15. Attached to this is the hydrophilic polyoxyethylene chain which is from 44.4 to 54.6 percent of the total molecular weight of 1,400 to 4,000.

A particularly useful group of nonionics is marketed under the trade name "Pluronics." The compounds are formed by condensing ethylene oxide with a hydrophobic base formed by the condensation of propylene oxide with propylene glycol. The molecular weight of the hydrophobic portion of the molecule is of the order of 950 to 4000 preferably 1200 to 2500. The addition of polyoxyethylene radicals to the hydrophobic portion tends to increase the solubility of the molecule as a whole. The molecular weight of the block copolymers varies from 1100 to 15,000 and the polyethylene oxide content may comprise 20 to 80 percent by weight.

Suitable nonionics may be derived by the condensation of ethylene oxide with the product resulting from the reaction of propylene oxide and ethylene diamine. The molecular weight varies from 500 to 4,500.

Other nonionic detergents include the ethylene oxide addends of monoesters of hexahydric alcohols and inner ethers thereof with higher fatty acids containing about 10 to 20 carbon atoms, e.g., sorbitan monolaurate, sorbitan mono-oleate, and mannitan monopalmitate.

The amphoteric detergents which can be used in the compositions of this invention are generally water-soluble salts of derivatives of aliphatic amines which contain at least one cationic group, e.g., non-quaternary nitrogen, quaternary ammonium, or quaternary phosphonium group, at least one alkyl group of about 8 to 18 carbon atoms and an anionic water-solubilizing carboxyl, sulfo, sulfato, phosphato or phosphon group in their molecular structure. The alkyl group may be straight chain or branched and the specific cationic atom may be part of a heterocyclic ring.

Examples of suitable ampholytic detergents include the alkyl beta-aminopropionates, $RN(H)C_2H_4COOM$; the alkyl beta-aminodipropionates, $RN(C_2H_4COOM)_2$; the alkyl and hydroxy alkyl taurinates, $RN(CH_3)C_2H_4SO_3M$; and the long-chain imidazole derivatives having the following formulas:

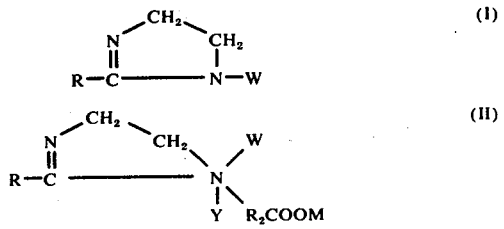

wherein R in formula (I) is an acyclic group of about 7 to 17 carbon atoms, W is selected from the group of $R_2OH$, $R_2COOM$, and $R_2OR_2COOM$, Y is selected from the group consisting of $OH^-$, $R_3OSO_3^-$, $R_2$ is an alkylene or hydroxyalkylene group containing 1 to 4 carbon atoms, R in formula (II) is selected from the group consisting of alkyl, alkyl aryl and fatty acyl glyceride groups having 6 to 18 carbon atoms in the alkyl or acyl group; and M is a water-soluble cation, e.g., sodium, potassium, ammonium or alkylolammonium.

Formula I detergents are disclosed in Volume II of "Surface Active Agents and Detergents" and in French Pat. No. 1,412,921 and Formula II detergents are described in U.S. Pat. No. 2,773,068; U.S. Pat. Nos. 2,781,354; and 2,781,357. The acyclic groups may be derived from coconut oil fatty acids (a mixture of fatty acids containing 8 to 18 carbon atoms), lauric fatty acid, and oleic fatty acid and the preferred groups are $C_7-C_{17}$ alkyl groups. Preferred detergents of this type are sodium N-lauryl beta-aminopropionate, disodium N-lauryl iminodipropionate, and the disodium salt of 2-lauryl-cycloimidium-1-hydroxyl, 1-ethoxyethanoic acid, 1-ethanoic acid.

Zwitterionic detergents such as the betaines and sulfobetaines having the following formula are also useful:

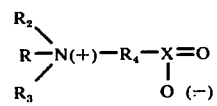

wherein R is an alkyl group containing about 10 to 18 carbon atoms, $R_2$ and $R_3$ are each $C_1-C_3$ alkyl, $R_4$ is an alkylene or hydroxyalkylene group containing about 1 to 4 carbon atoms, and X is C or S:O. The alkyl group can contain one or more intermediate linkages such as amido, ether or polyether linkages or nonfunctional substituents such as hydroxyl or halogen which do not substantially affect the hydrophobic character of the group. When X is C, the detergent is called a betaine; and when X is S:O, the detergent is called a sulfobetaine or sultaine. Preferred betaine and sulfobetaine detergents are 1-(lauryl dimethyl ammonio) acetate, 1-(myristyl dimethylammonio) propane-3-sulfonate, and 1-(myristyl dimethylammonio)-2-hydroxy-propane-3-sulfonate.

The polar nonionic detergents are those in which the hydrophilic group contains a semi-polar bond directly between two atoms, for example, N → O; P → O; As → O; and S → O. There is charge separation between the two directly bonded atoms, but the detergent molecule bears no net charge and does not dissociate into ions.

The polar nonionic detergents of this invention include open-chain aliphatic amine oxides of the general formula $R_1R_2R_3N \to O$. For the purpose of this invention $R_1$ is an alkyl, alkenyl, or monohydroxyalkyl radical having about 10 to 20 carbon atoms. $R_2$ and $R_3$ are each selected from the group consisting of methyl, ethyl, propyl, ethanol, and propanol radicals.

Other operable polar nonionic detergents are the open-chain aliphatic phosphine oxides having the general formula $R_1R_2R_3P \to O$ wherein $R_1$ is an alkyl, alkenyl, or monohydroxyalkyl radical ranging in chain length from 10 to 18 carbon atoms, and $R_2$ and $R_3$ are each alkyl and monohydroxyalkyl radicals containing from 1 to 3 carbon atoms.

As used herein the term "nonionic surfactant" refers to a compound used in the formulation which compound is other than the polymeric polyhydric material which is also required and the term "nonionic surfactant" is also meant to include amphoteric, zwitterionic and polar nonionic surfactants which are useful surfactants in the practice of this invention.

The boric acid-borax buffering system is present in the formulation of the present invention at about 0.25 to about 0.75% by weight of the mixture, more preferably from about 0.4 to about 0.6% of the mixture. It has been found that by keeping the ratio of borax to boric acid within specific limits significant improvement in the flaking properties of the spray starch can be obtained. More specifically, it has been found that when the ratio of borax to boric acid is between the range of about 5:1 to about 3:1, more preferably about 4:1, an unexpected improvement is achieved in that a reduced tendency to scorch and flake is obtained when the formulation is applied to fabrics and ironed.

Other materials, having specific functional characteristics may also be present in the new formulations in addition to the aqueous solution or dispersion of starch, boric acid-borax buffering system, nonionic surfactant, and polyhydric component. These additional materials may include starch preservatives such as sodium benzoate; perfumes; anti-foaming agents such as silicone emulsions, e.g. dimethyl polysiloxane emulsion (10% silicone); colloidal dispersants; bactericides, such as formalin; ironing aids such as silicone and fluorocarbon compounds; anticorrosion agents such as sodium nitrite; sizing agents, such as alkali metal, e.g. sodium, carboxymethyl cellulose; and a host of other functional materials known in the art.

DESCRIPTION OF SPECIFIC EMBODIMENTS

The following examples include preferred and typical sprayable starch formulations that may be prepared in accordance with the invention.

EXAMPLE 1 AND COMPARATIVE EXAMPLE A

The following sprayable starch formulations are prepared.

| Ingredients | Percent by Weight | |
|---|---|---|
| | Example 1 | Comparative Example A |
| Ethoxylated corn starch* | 4.00 | 4.00 |
| Sodium carboxymethylcellulose | 0.2 | 0.2 |
| Boric acid | 0.1 | — |
| Borax | 0.4 | — |
| Formalin (27%) | 0.042 | 0.042 |
| Silicone anti-foam [dimethyl polysiloxane emulsion (10% silicone]** | 0.5 | — |
| Polyethylene glycol (m.w. 6000) | 0.2 | — |
| Octyl phenoxy polyethoxy ethanol (9–10 oxyethylene groups per molecule) | 0.05 | — |
| NaNO$_2$ | 0.1 | 0.1 |
| Dimethyl polysiloxane emulsion (37% silicone)*** | 0.5 | 0.5 |
| Perfume | 0.015 | 0.015 |
| Propylene glycol | — | 1.0 |
| Sodium benzoate | — | 0.10 |
| Deionized water | Bal. | Bal. |

*The ethoxylated corn starch of Example 1 and Comparative Example A is a Corn Products Low Viscosity Starch which can be characterized as follows:

| | |
|---|---|
| Degree of Ethoxylation | a mixture of compounds having 0.05 to 0.07 oxyethylene units per 100 glucose units |
| Color | White |
| Texture | Free flowing powder |
| pH (10 percent dispersion) | 5.5–6.0 |
| Viscosity$^1$ | 17.7±5.0 cps |
| Moisture | 12.5 percent max. |
| Ash | 0.5 percent max. |

$^1$Viscosity of 10 percent dispersion cooled for 30 minutes at 200° F.

using Brooksfield R.V.F., Spindle No. 1 at 20 RPM at 80° F.
**Union Carbide SAG-470
***General Electric SM-2061

In preparing the foregoing formulations the starch ingredient is first either dispersed (propoxylated and ethoxylated starches) or dissolved (soluble starches) in hot water. The remaining ingredients are then added to the starch solution and the mixture is thoroughly blended in a suitable apparatus.

From about 98 parts to about 90 parts of the ultimate formulation and about 2 parts to about 10 parts of a suitable propellant can then be packaged in a suitable aerosol container. In these examples, 94 parts of the formulation and 6 parts of isobutane were combined to produce the aerosol formulations. Among the propellant fluids that are preferably used are the liquefied gases, materials which at atmospheric temperature and pressure will usually be in the gaseous state. Preferred useful propellants are liquefied gases or mixtures thereof of the hydrocarbon and/or halohydrocarbon types, preferably of 1 to 4 carbon atoms, with the halohydrocarbons having chlorine and/or fluorine as the halogen(s) thereof. Other liquefied gas propellants of the hydrocarbon and halogenated hydrocarbon types may also be employed in desired ratios to yield the dispensing pressure, which is normally from 10 to 100 lbs./sq. in, more preferably 30 to 60 lbs./sq. in. and often ideally about 50 lbs./sq. in. Such pressures are given at 25° C. (room temperature). Among the propellants which may be employed are chlorodifluoromethane; dichlorodifluoromethane; difluoroethane; vinyl chloride; chlorodifluoroethane; dichlorotetrafluoroethane; (asymmetrical); dichlorotetrafluoroethane (symmetrical); chlorotrifluoroethane; dichlorofluoroethane; "Chlorothene" (CCl$_3$.CH$_3$); and octafluorocyclobutane; all of which are examples of halogenated hydrocarbon propellants. Among the hydrocarbon propellants may be mentioned propane; 2-methyl propane (isobutane); n-butane and cyclobutane. Other such propellants are discussed in the text *Pressurized Packaging (Aerosols)* by Herzka and Pickthall (1958, Academic Press Inc., New York) at pages 19–77. Other useful propellants include inorganic gaseous propellants such as nitrogen, nitrous oxide and carbon dioxide.

The starch formulations of Example 1 and Comparative Example A are tested and compared as follows:

Ten pre-washed cotton swatches were ironed consecutively at the cotton setting using various conventional irons as indicated below, at 50% wet pickup level (on fabric). Visual observations are made and ratings are assigned on a scale.

| | Teflon Iron w/o Steam | Teflon Iron w/Steam | Metal Steam Iron (Dry) | Metal Steam Iron (Steam) | Flat Iron |
|---|---|---|---|---|---|
| Example 1 | 0 | 0 | 0 | 0 | 0 |
| Comparative | 3 | 2 | 1 | 2 | 2 |

|  | Teflon Iron w/o Steam | Teflon Iron w/Steam | Metal Steam Iron (Dry) | Metal Steam Iron (Steam) | Flat Iron |
|---|---|---|---|---|---|
| Example A |  |  |  |  |  |

Scale:
0 - hardly noticeable
1 - slight
2 - moderate
3 - bad

A comparison of the formulations of Example 1 and Example A clearly indicate the improved effects that are obtained by use of the boric acid-borax buffering system, nonionic surfactant, and polyhydric component.

Other sprayable formulations in accordance with the invention are prepared in Examples 2 to 4.

EXAMPLE 2

| Ingredients | Percent by Weight |
|---|---|
| Propoxylated Corn Starch* | 6.0 |
| Sodium carboxymethylcellulose | 0.05 |
| Boric acid | 0.05 |
| Borax | 0.25 |
| Formalin (27%) | 0.042 |
| Polyethylene glycol (m.w. 2000) | 1.0 |
| Octylphenoxy polyethoxy ethanol (As in Example 1) | 0.5 |
| NaNO$_2$ | 0.3 |
| Dimethyl polysiloxane emulsion (37% silicone)*** | 1.0 |
| Dimethyl polysiloxane emulsion (10% silicone)*** | 0.75 |
| Perfume | 0.015 |
| Deionized water | Balance |

*The propoxylated corn starch of Example 2 is sold as a Corn Products low Viscosity Starch and can be characterized as follows:

| Degree of Propoxylation | 0.05 to 0.07 oxypropylene units per 100 glucose units |
|---|---|
| Color | White |
| Texture | Free flowing powder |
| pH (10% dispersion) | 5.5–7.0 |
| Viscosity$^1$ | 17.5±5.0 cps |
| Moisture | 12.5 percent max. |
| Ash | 0.5 percent max. |

$^1$Viscosity of 10 percent dispersion cooled for 30 minutes at 200° F using Brookfeld R.V.F. Spindle No. 1 at 20 RPM at 80° F
 and * - As in Example 1

EXAMPLE 3

| Ingredients | Percent by Weight |
|---|---|
| Hypochlorite Oxidized Corn Starch * | 2.0 |
| Boric acid | 0.15 |
| Borax | 0.5 |
| Polyethylene glycol (m.w. 4000) | 0.05 |
| Nonyl phenol (condensed with 9 moles of ethylene oxide) | 0.01 |
| NaNO$_2$ | 0.05 |
| Dimethyl polysiloxane emulsion (37% silicone)*** | 0.1 |
| Dimethyl polysiloxane emulsion (10% silicone)** | 0.25 |
| Deionized water | Balance |

*The degree of hypochlorite oxidation is in the range of about 10 to about 20 scott. The scott viscosity test is run at a solids content of about 4%.
*,  and * - As in Example 1.

EXAMPLE 4

| Ingredients | Percent by Weight |
|---|---|
| Ethoxylated corn starch* | 4.0 |
| Boric acid | 0.1 |
| Borax | 0.4 |
| Polyethylene glycol (m.w.-6000) | 0.2 |
| Dinonyl phenol (condensed with 15 moles of ethylene oxide) | 0.05 |
| Dimethyl polysiloxane emulsion (37% silicone)*** | 0.5 |
| Dimethyl polysiloxane emulsion (10% silicone)** | 0.5 |
| Deionized water | Balance |

*, and * - As in Example 1.

When sprayed onto cotton fabrics, the above formulations are virtually free of any flaking problem. Further no significant problem of aerosol valve clogging is experienced. The above formulations provide fabrics with a smooth "hand" as opposed to the somewhat harsh feel usually associated with starched garments.

Although the invention has been described and illustrated with reference to certain specific embodiments, modifications can be made without departing from the spirit and scope of the invention as defined by the following claims.

What is claimed is:

1. An aerosol starch formulation for use in finishing laundered textile garments comprising from about 2 to about 10 parts by weight of a liquefied normally gaseous propellant and from about 98 to about 90 parts by weight of an aqueous starch composition consisting essentially of water and from about 2 to about 6 percent by weight starch, from about 0.05 to about 1.0 percent by weight of a polyhydric material which enhances the wetting and anti-clogging properties of the composition and is selected from the group of polymeric glycols of alkanes and olefins having from 2 to about 6 carbon atoms, from about 0.01 to about 0.5 percent by weight of a nonionic surfactant, from about 0.05 to about 0.15 percent by weight of boric acid and from about 0.2 to about 0.6 percent by weight of borax, said formulation having a substantially reduced tendency to flake when applied onto fabric which is then ironed.

2. The formulation of claim 1 wherein the ratio of borax to boric acid is from about 5:1 to about 3:1.

3. The formulation of claim 1 which further contains, as an anti-foaming agent, from about 0.25 to about 0.75 percent by weight of a dimethyl polysiloxane emulsion containing about 10% by weight of silicone.

4. The formulation of claim 1 which further contains, as an ironing aid, from about 0.1 to about 1.0% by weight of a dimethyl polysiloxane emulsion containing about 37% by weight of silicone.

5. The formulation of claim 1 wherein said starch is a low viscosity starch derivative chosen from the group consisting of propoxylated and ethoxylated starches.

6. The formulation of claim 1 wherein said polyhydric material is a polyethylene glycol.

7. The formulation of claim 1 wherein said nonionic surfactant is an octylphenoxy polyethoxy ethanol having about 9 to 10 oxyethylene groups per molecule.

8. An aerosol starch formulation for use in finishing laundered textile garments comprising about 6 parts by weight of a liquefied isobutane propellant and about 94 parts by weight of an aqueous starch formulation consisting essentially of about water and 4 percent by weight of an ethoxylated corn starch, about 0.2 percent by weight of polyethylene glycol having a molecular weight of about 6,000, about 0.05 percent of octylphenoxy polyethoxy ethanol having about 9 to 10 oxyethylene groups per molecule, about 0.4 percent by weight of borax, about 0.1 percent by weight of boric acid, about 0.5 percent of a dimethyl polysiloxane emulsion containing about 10% silicone and about 0.5 percent of a dimethyl polysiloxane emulsion containing about 37% silicone, said formulation having a substantially reduced tendency to flake when applied to a fabric which is then ironed.

9. The formulation of claim 6 wherein the polyethylene glycol has a molecular weight from about 1,000 to about 12,000.

* * * * *